US012030308B2

(12) United States Patent
Yanase et al.

(10) Patent No.: US 12,030,308 B2
(45) Date of Patent: Jul. 9, 2024

(54) IMAGE FORMING APPARATUS

(71) Applicant: Ricoh Company, Ltd., Tokyo (JP)

(72) Inventors: Norikazu Yanase, Kanagawa (JP); Makoto Kikura, Kanagawa (JP); Tsuguyori Kemma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/520,726

(22) Filed: Nov. 8, 2021

(65) Prior Publication Data

US 2022/0055386 A1 Feb. 24, 2022

Related U.S. Application Data

(60) Continuation of application No. 16/131,876, filed on Sep. 14, 2018, now Pat. No. 11,198,310, which is a (Continued)

(30) Foreign Application Priority Data

Dec. 13, 2010 (JP) ................................ 2010-277462

(51) Int. Cl.
*B41J 19/20* (2006.01)
*B41J 25/00* (2006.01)

(52) U.S. Cl.
CPC ........... *B41J 19/202* (2013.01); *B41J 19/207* (2013.01); *B41J 25/001* (2013.01)

(58) Field of Classification Search
None
See application file for complete search history.

(56) References Cited

U.S. PATENT DOCUMENTS 6,270,187 B1 8/2001 Murcia et al.
6,524,021 B2 * 2/2003 Johnson ................ B41J 25/304 400/354

(Continued)

FOREIGN PATENT DOCUMENTS

EP 1574349 A1 9/2005
JP 2001-113772 A 4/2001

(Continued)

OTHER PUBLICATIONS

International Search Report dated Jan. 17, 2012, in PCT/JP2011/078629 filed on Dec. 5, 2011.

(Continued)

*Primary Examiner* — Alejandro Valencia
(74) *Attorney, Agent, or Firm* — XSENSUS LLP

(57) ABSTRACT

In an image forming apparatus, a carriage mounts a recording head for discharging droplets, and moves in a main scan direction. A guide member slidably guides the carriage. An encoder scale is arranged along the main scan direction. An encoder sensor reads the encoder scale. The carriage includes a head mounting part for mounting the recording head, and a sensor attaching part for attaching the encoder sensor. The sensor attaching part is provided so as to be extended from the head mounting part. The encoder scale is arranged at a location which the encoder sensor can read. A partition member is provided to separate the head mounting part from the sensor attaching part in the carriage. The head mounting part is arranged in a first space, and the sensor attaching part and the encoder scale are arranged in a second space separated from the first space by the partition member.

19 Claims, 6 Drawing Sheets

Related U.S. Application Data division of application No. 14/885,474, filed on Oct. 16, 2015, now abandoned, which is a division of application No. 13/990,096, filed as application No. PCT/JP2011/078629 on Dec. 5, 2011, now Pat. No. 9,283,785.

(56) References Cited

U.S. PATENT DOCUMENTS

| | | | | |
|---|---|---|---|---|
| 6,601,944 | B1 | 8/2003 | Kawazoe | |
| 6,834,925 | B2 * | 12/2004 | Ikeda | B41J 2/04556 347/86 |
| 6,921,217 | B2 * | 7/2005 | Tsuji | B41J 25/308 400/59 |
| 7,140,793 | B2 | 11/2006 | Cook | |
| 7,275,882 | B2 | 10/2007 | Ishikawa et al. | |
| 7,568,852 | B2 | 8/2009 | Nottelman et al. | |
| 7,806,510 | B2 | 10/2010 | Samoto et al. | |
| 2002/0057301 | A1 | 5/2002 | Ikeda | |
| 2003/0103119 | A1 | 6/2003 | Sakai et al. | |
| 2005/0195242 | A1 * | 9/2005 | Samoto | B41J 19/00 347/37 |
| 2005/0281603 | A1 | 12/2005 | Cook | |
| 2007/0139462 | A1 | 6/2007 | Tamaki | |
| 2007/0165061 | A1 | 7/2007 | Samoto | |
| 2009/0040252 | A1 | 2/2009 | Tanaka et al. | |
| 2011/0074856 | A1 | 3/2011 | Iesaki et al. | |
| 2011/0273511 | A1 | 11/2011 | Yanase et al. | |
| 2011/0279499 | A1 | 11/2011 | Kemma et al. | |
| 2013/0050335 | A1 | 2/2013 | Tanaka et al. | |

FOREIGN PATENT DOCUMENTS

| | | | |
|---|---|---|---|
| JP | 2004-175072 | A | 6/2004 |
| JP | 2004-195653 | A | 7/2004 |
| JP | 2005-081691 | A | 3/2005 |
| JP | 2005-349799 | A | 12/2005 |
| JP | 2009-056666 | A | 3/2009 |
| JP | 2009-214376 | A | 9/2009 |
| JP | 2010-188577 | A | 9/2010 |
| JP | 2011-212893 | A | 10/2011 |

OTHER PUBLICATIONS

Korean Office Action dated Nov. 24, 2014, issued in Korean Patent Application No. 10-2013-7014352 (with English translation).

European Search Report dated Nov. 4, 2015, in corresponding European Patent Application No. 11849815.3.

Office Action dated Sep. 9, 2019 for copending U.S. Appl. No. 14/885,474.

* cited by examiner

IMAGE FORMING APPARATUS

CROSS-REFERENCE TO RELATED APPLICATIONS

This application is a continuation of U.S. application Ser. No. 16/131,876, filed on Sep. 14, 2018, which is a divisional of U.S. application Ser. No. 14/885,474, filed on Oct. 16, 2015, which is a divisional of U.S. application Ser. No. 13/990,096 filed on May 29, 2013 (now U.S. Pat. No. 9,283,785), which is based on PCT filing PCT/JP2011/078629, filed on Dec. 5, 2011 and claims the priority of Japanese Patent Application No. 2010-277462, filed on Dec. 13, 2010, the entire contents of each are incorporated herein by reference.

TECHNICAL FIELD

The present invention generally relates to an image forming apparatus, and more particularly to the image forming apparatus which includes a carriage mounting a recording head for ejecting droplets.

BACKGROUND ART

As an image forming apparatus such as a printer, a facsimile, a copier, a plotter, a multifunctional apparatus integrating them, or the like, for example, an inkjet recording apparatus is well known as a liquid discharge recording scheme by using a recording head which is formed by a liquid discharge head (droplet discharge head) for discharging ink droplets. In the image forming apparatus of the liquid discharge recording scheme, an image is formed by discharging ink droplets from a recording head onto a sheet being conveyed. The sheet is not limited to a paper sheet. The sheet may be an OHP (Over Head Projector) and other types of sheets onto which the ink droplet or other liquid can be adhered, and may be called as a medium to be recorded, a recording paper, a recording sheet, or the like. Recording, printing, and the like are synonymous with forming an image. There are a plurality of serial type image forming apparatus for forming an image by discharging droplets while the recording head moves in a main scan direction, and a line type image forming apparatus using a line type head for forming an image by discharging droplets in a state in which the recording head does not move.

In order to detect a main scan location of a carriage mounting the recording head, the serial type image forming apparatus includes a linear encoder formed by an encoder scale arranged in the main scan direction and an encoder sensor mounted at a carriage side. However, since the image is formed by discharging droplets from the recording head, when mist is adhered to the encoder scale, misreading of a head location occurs and detection accuracy of a carriage location is degraded. Thus, image quality is degraded.

Accordingly, Japanese Laid-open Patent Application No. 2005-081691 discloses that the linear encoder is formed by the encoder scale arranged in a vicinity of a carriage conveyance belt and an encoder sensor provided at a lateral surface of the carriage, and a shielding plate is arranged between an upper portion of the carriage conveyance belt at least and the encoder scale.

Moreover, Japanese Laid-open Patent Application No. 2001-113772 discloses that the linear encoder is formed by the encoder scale arranged in the vicinity of the carriage conveyance belt and the encoder sensor provided at the lateral surface of the carriage. A cover is provided to cover the encoder sensor and a part of the encoder scale in the vicinity of the encoder sensor. The cover includes a guide part for guiding the encoder scale to a predetermined location with respect to the encoder sensor.

However, in the above described technologies, since the recording head of the carriage and the encoder scale are arranged within the same space, the mist, which is discharged with the droplets from the recording head, goes around the shielding plate and reaches and adheres to the encoder scale or to a portion which is not shielded by the cover.

DISCLOSURE OF THE INVENTION

The present invention solves or reduces one or more of the above problems.

In an aspect of this disclosure, there is provided an image forming apparatus, including a carriage configured to mount a recording head for discharging droplets and to move in a main scan direction; a guide member configured to slidably guide the carriage; an encoder scale configured to be arranged along the main scan direction; and an encoder sensor configured to be mounted to the carriage and to read the encoder scale, wherein the carriage includes a head mounting part configured to mount the recording head; and a sensor attaching part configured to attach the encoder sensor at least, wherein the sensor attaching part is provided so as to be extended from the head mounting part; the encoder scale is arranged at a location possible for the encoder sensor attached to the sensor attaching part to read; a partition member is provided to separate the head mounting part from the sensor attaching part in the carriage; and the head mounting part is arranged in a first space, and the sensor attaching part and the encoder scale are arranged in a second space which is separated from the first space by the partition member.

BRIEF DESCRIPTION OF THE DRAWINGS

Other objects, features, and advantages of the present invention will become more apparent from the following detailed description when read in conjunction with the accompanying drawings, in which.

BEST MODE FOR CARRYING OUT THE INVENTION

Figure 1:
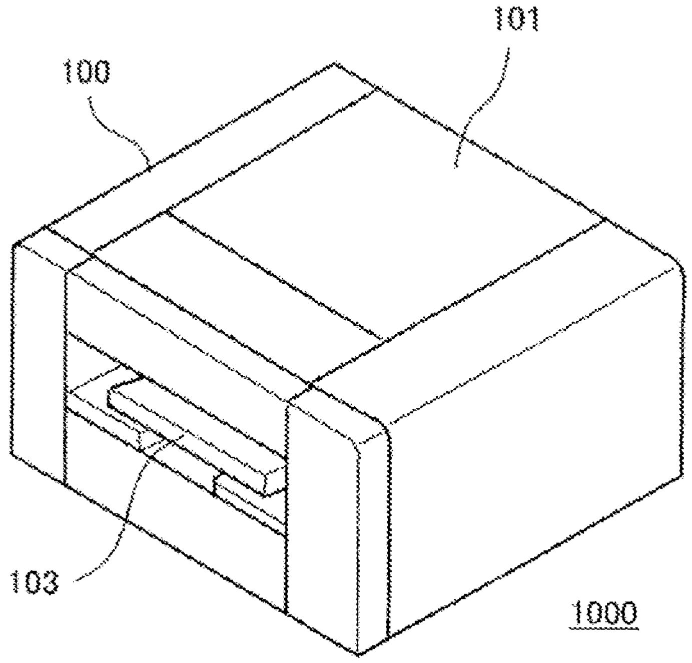
FIG. 1 illustrates a perspective view for explaining an outer appearance of the image forming apparatus.
Figure 2:
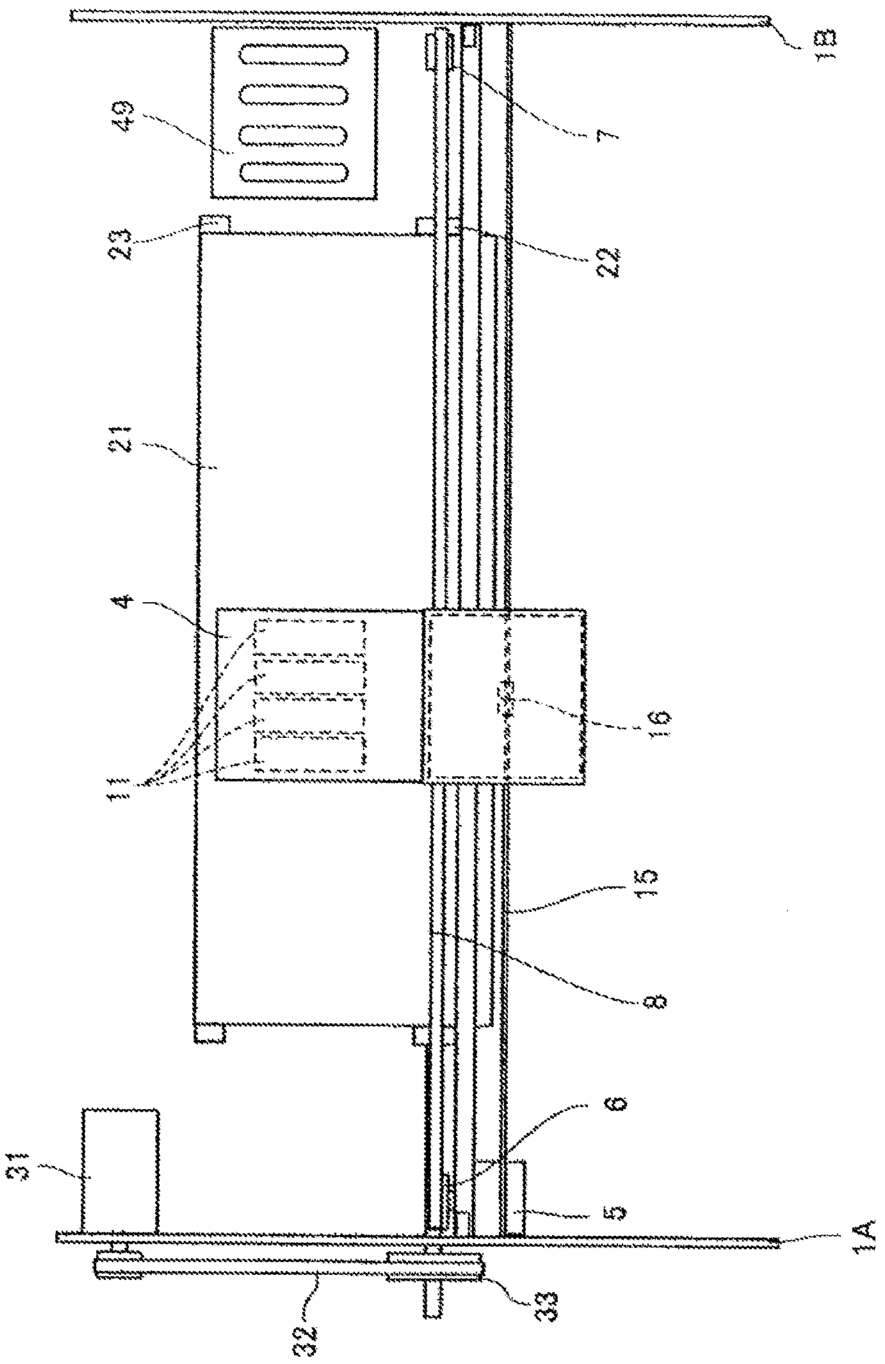
FIG. 2 illustrates a plan view for explaining a mechanical portion of the image forming apparatus.

In the following, embodiments of the present invention will be described with reference to the accompanying drawings. An example of an image forming apparatus 1000 will be briefly described with reference to FIG. 1 and FIG. 2. FIG. 1 illustrates a perspective view for explaining an outer appearance of the image forming apparatus 1000. FIG. 2 illustrates a plan view for explaining a mechanical portion of the image forming apparatus 1000.

In the embodiments described below, the "image forming apparatus" 1000 being a liquid discharge recording scheme is regarded as an apparatus for forming an image by discharging liquid onto a medium such as paper, string, fabric, cloth, leather, metal, plastic, glass, wood, ceramics, or the like. Also, an "image formation" may include not only applying an image having a message such as a letter, a graphic, or the like onto the medium but also applying an image such as a pattern which does not have a message (simply, a droplet is landed onto the medium). An "ink" is not limited to material called ink, and may be generically denoted as any liquid used for the image formation such as recording liquid, fixing process liquid, simply called liquid, and the like. For example, a DNA specimen, a resist, a pattern material, resin, or the like may be regarded as the ink. Also, the "image" is not limited to a planar image and may be an image applied onto a three-dimensionally formed object, an image formed by three-dimensionally modeling a solid object, and the like.

The image forming apparatus 1000 is regarded as a serial type image forming apparatus. At an upper lateral side of a body 100, a cover 101 is provided to be opened and closed. The mechanical portion inside the image forming apparatus 1000 may be accessed by opening the cover 101.

As illustrated in FIG. 2, in the mechanical portion, a carriage 4 is slidably retained in a main scan direction by a guide member 3 (FIG. 3) bridging laterally between main lateral plates 1A and 1B at right and left sides. The carriage 4 is moved in the main scan direction by a timing belt 8 which is stretched between a driving pulley 6 and a driven pulley 7 by a main scan motor 5.

The carriage 4 includes multiple recording head units 11 each which includes a liquid discharge head regarded as an image forming part for discharging droplets respective to yellow (Y), cyan (C), magenta (M), and black (B), and a head tank for supplying ink to the liquid discharge head. In each of the recording head units 11, a nozzle line having multiple nozzles is arranged in a sub scan direction perpendicular to the main scan direction. Each of the recording head units 11 is mounted so that a droplet discharge direction is oriented downward. The multiple recording head units 11 are retained by a head holder (not shown) as one unit and mounted to the carriage 4. In the following, the recording head units 11 may be simply called "recording heads 11".

Also, an encoder scale 15 is arranged along the main scan direction of the carriage 4. An encoder sensor 16 is attached at a side of the carriage 4. The encoder sensor 16 is formed by a transmissive photosensor for reading a scale (location identification part) of the encoder scale 15. A linear encoder is formed as a location detection device by the encoder scale 15 and the encoder sensor 16.

On the other hand, under the carriage 4, a conveyance belt 21 is arranged as a conveyance part for conveying a sheet (not shown) in the sub scan direction. The conveyance belt 21 is regarded as an endless belt hung on a conveyance roller 22 and tensioning roller 23. By rotating and driving the conveyance roller 22 through a timing belt 32 and a timing pulley 33 by a sub scan motor 31, the conveyance belt 21 is rotated and moved in the sub scan direction.

Furthermore, a maintenance recovery mechanism 49 is arranged at one side of the main scan direction of the carriage 4 and a lateral side of the conveyance belt 21, to perform a maintenance recovery for the recording heads 11. The maintenance recovery mechanism 49 may include a cap member for capping a nozzle surface (a surface on which nozzles are formed) of the recording heads 11, a wiper member for wiping the nozzle surface, an idle discharge receiver for discharging a droplet which does not contribute to the image formation.

Also, as illustrated in FIG. 1, a paper feed and ejection tray 103 is detachably mounted to the body 100. The paper feed and ejection tray 103 includes a paper feed part for feeding a sheet to the conveyance belt 21, and a paper ejection part for ejecting the sheet on which the liquid discharged from the recording heads 11 as an image formation part is adhered and an image is formed.

In the image forming apparatus 1000 formed as described above, the sheet fed by the paper feed part is intermittently conveyed by the conveyance belt 21, and the recording heads 11 are driven in response to an image signal by moving the carriage 4 in the main scan direction, thereby one line is recorded by discharging droplets onto the stopped sheet. After a predetermined amount of the sheet is conveyed, the image is formed onto the sheet by repeating an operation for performing recording of a next line. When the image is formed, the sheet is ejected.

Figure 3:
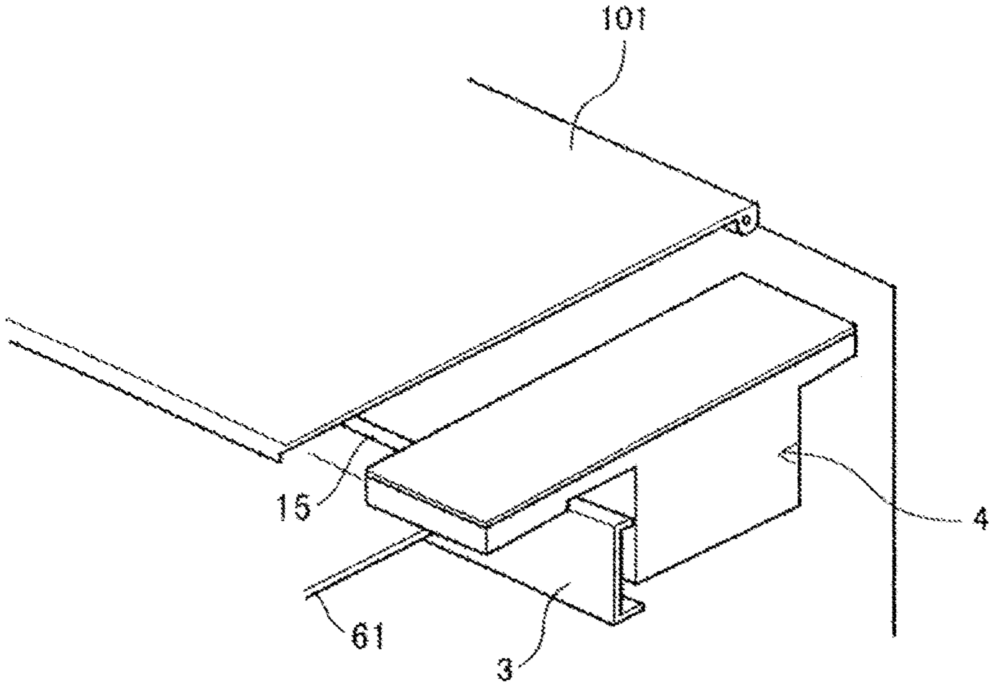
FIG. 3 is a schematic view for explaining a substantial portion of a carriage part in a first embodiment.
Figure 4:
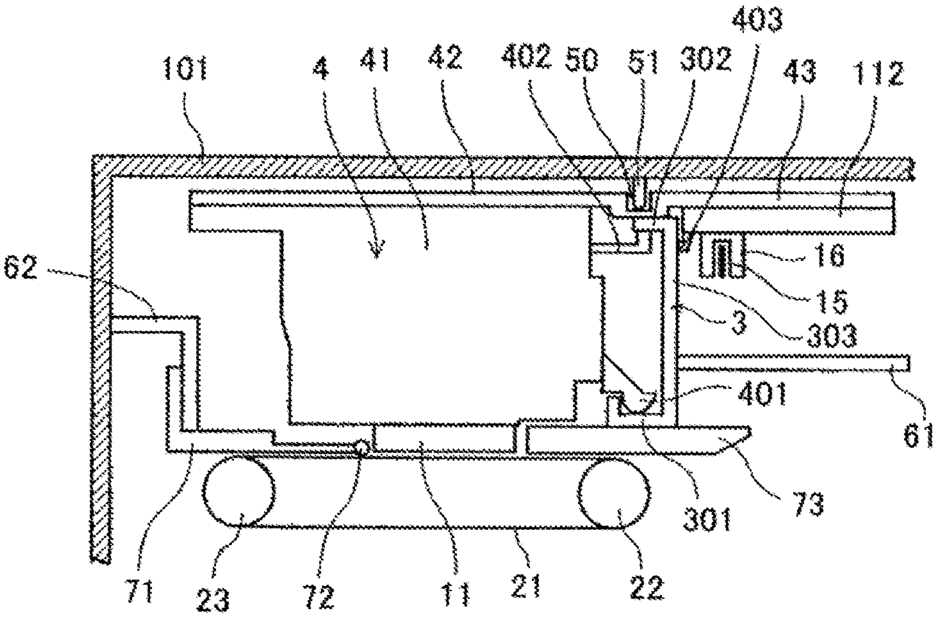
FIG. 4 is a lateral view of the carriage part in the first embodiment.
Figure 5:
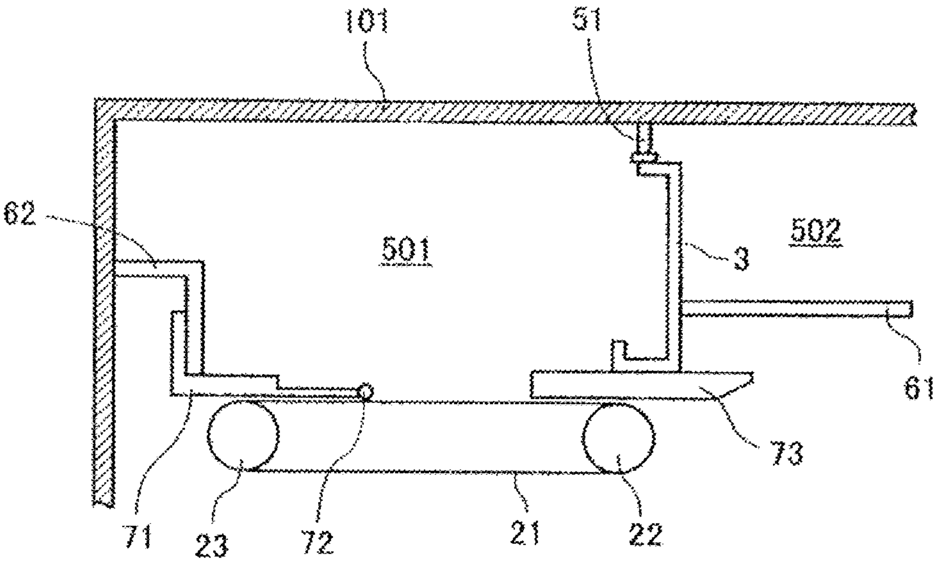
FIG. 5 is a diagram schematically illustrating a spatial configuration in FIG. 4 according to the first embodiment.

Next, a first embodiment in the image forming apparatus 1000 will be described with reference to FIG. 3 through FIG. 5. FIG. 3 is a schematic view for explaining a substantial portion of a carriage part in the first embodiment. FIG. 4 is a lateral view of the carriage part in the first embodiment. FIG. 5 is a diagram schematically illustrating a spatial configuration in FIG. 4 according to the first embodiment.

For the carriage 4, a carriage cover 42 is provided to cover an upper portion of a head mounting part 41 at the upper portion of the head mounting part 41 which mounts the recording heads 11. Also, a sensor attaching part 43 is provided. The sensor attaching part 43 is regarded as a portion which forms a single member with the carriage cover 42 and which is extended from the head mounting part 41 along a direction for feeding the sheet.

A head side substrate 112 mounting a head side electrical component is attached to a downward surface of the sensor attaching part 43. An encoder sensor 16 is provided on the head side substrate 112. The encoder scale 15 is arranged at a location readable for the encoder sensor 16.

The guide member 3 for slidably guiding the carriage 4 is formed by a steel plate, and includes guide surfaces 301, 302, and 303 to be a supporting surface in order to slidably guide the carriage 4. The head mounting part 41 of the carriage 4 includes a sliding part 401 which slidably contacts the guide surface 301 of the guide member 3, a sliding part 402 which slides in contact with the guide surface 302, and a sliding part (slider) 403 which slides in contact with the guide surface 303. In this case, the guide surface 301 of the guide member 3 is used as a surface to determine a location of the carriage 4 in height. The guide surface 302 is used as a surface (rotation stopper) to receive a moment of force due to a weight of the carriage 4 itself. The guide surface 303 is used as a surface to determine a location of the carriage 4 in the sub scan direction.

The guide member 3 is arranged for the entirety of the main scan direction, and is also used as a partition member for separating the head mounting part 41 from the sensor attaching part 43 and the encoder scale 15 in the carriage 4.

Also, at the downward surface of the sensor attaching part 43 of the carriage 4, a front stay 61 contacting the guide member 3 is arranged.

Moreover, a concave portion 50 is provided to the carriage cover 42 of the carriage 4 between a side of the head mounting part 41 and the sensor attaching part 43. Then, a partition member 51 is provided to the cover 101. The partition member 51 is fitted in the concave portion 50 of the carriage cover 42, and separates the head mounting part 41 from the sensor attaching part 43 at an upper portion side of the carriage 4. The partition member 51 is arranged in the entirety of the main scan direction.

By this configuration, the head mounting part 41 is separated from the sensor attaching part 43 even at the upper side of the carriage 4. Therefore, by the partition member 51 fitting in the concave portion 50, it is possible to approximately shield the sensor attaching part 43 from the head mounting part 41.

On the other hand, between the carriage 4 and the conveyance belt 21, a pressure plate 71 is arranged with respect to a rear stay 62, and a paper ejection guide 73 under the guide member 3. The pressure plate 71 includes, at a tip portion, a pressure roller 72 for pressing the sheet to the conveyance belt 21. The paper ejection guide 73 guides the sheet ejected from the conveyance belt 21.

By this configuration, as illustrated in FIG. 5, a space where the carriage 4 moves is divided into a space 501 where the head mounting part 41 of the carriage 4 moves, and a space 502 where the sensor attaching part 43 of the carriage 4 moves and the encoder scale 15 is arranged.

In the above configuration, in a case in which the droplets are discharged from the recording heads 11 mounted to the head mounting part 41 of the carriage 4, even if mist occurs and floats in the space 501, the mist is shielded by the guide member 3 and the partition member 51. Even if the sensor attaching part 43 moves, the mist hardly enters the space 502 where the encoder scale 15 is arranged. It is possible to reduce adherence of the mist to the encoder scale 15.

As described above, the carriage 4 includes the head mounting part 41 for mounting the recording heads 11 and at least the sensor attaching part 43 for attaching the encoder sensor 16. The sensor attaching part 43 is provided so as to be extended from the head mounting part 41. The encoder scale 15 is arranged at the location which the encoder sensor 16 can read. The partition member 51 is arranged to separate the head mounting part 41 from the sensor attaching part 43 in the carriage 4. Then, the head mounting part 41 of the carriage 4 is arranged in the space 501, and the sensor attaching part 43 and the encoder scale 15 are arranged in the space 502 different from the space 501 in which the spaces 501 and 502 are separated by the partition member 51. It is possible to reduce the adherence of the mist to the encoder scale 15.

Figure 6:
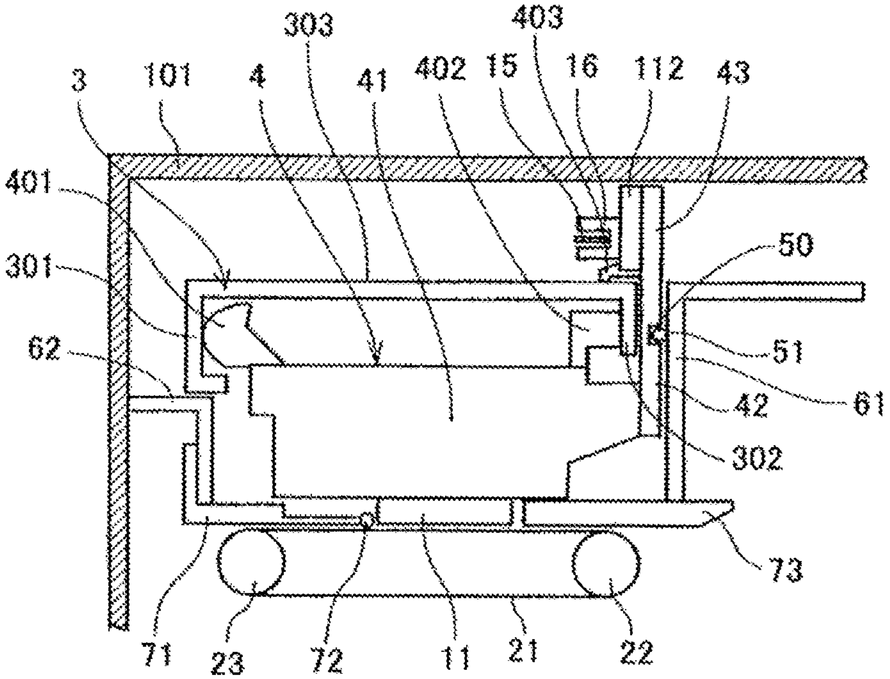
FIG. 6 is a lateral view of the carriage part in a second embodiment.
Figure 7:
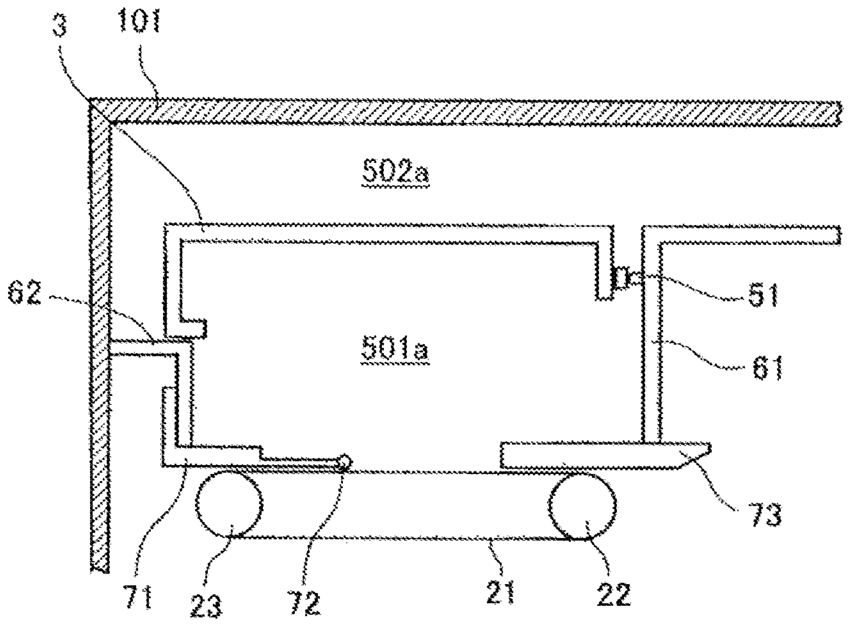
FIG. 7 is a diagram schematically illustrating a spatial configuration in FIG. 6 according to the second embodiment.

Next, a second embodiment will be described with reference to FIG. 6 and FIG. 7. FIG. 6 is a lateral view of the carriage part in the second embodiment. FIG. 7 is a diagram schematically illustrating a spatial configuration in FIG. 6 according to the second embodiment. In these figures, parts that are the same as those illustrated in the previously described figures are given by the same reference numbers.

In the second embodiment, the sensor attaching part 43 is provided upward from the head mounting part 41 of the carriage 4. The encoder scale 15, which is read by the encoder sensor 16, is arranged above the head mounting part 41. The guide member 3 is arranged above the head mounting part 41 and below the encoder sensor 16 of the sensor attaching part 43. Thus, the sensor attaching part 43 is separated from the head mounting part 41.

Moreover, between the front stay 61 and the sensor attaching part 43, the partition member 51 is provided to fit in the concave portion 50 formed on the sensor attaching part 43.

By the above configuration, as illustrated in FIG. 7, a space where the carriage 4 is divided into an upper space and a lower space by the guide member 3 and the partition member 51. In a space 501*a* as the upper space, the head mounting part 41 of the carriage 4 moves. In a space 502*a* different from the space 501*a*, the sensor attaching part 43 of the carriage 4 moves and the encoder scale 15 is arranged.

Accordingly, similar to the first embodiment, in a case in which the droplets are discharged from the recording heads 11 mounted to the head mounting part 41 of the carriage 4, even if mist occurs and floats in the space 501*a*, the mist is shielded by the guide member 3 and the partition member 51. Even if the sensor attaching part 43 moves, the mist hardly enters the space 502*a* where the encoder scale 15 is arranged. It is possible to reduce adherence of the mist to the encoder scale 15. Moreover, the encoder scale 15 is arranged in the space 502*a* sectioned above the head mounting part 41. Since the mist does not float upward easily because of gravity, it is possible to acquire a further reduction effect of mist adherence.

Figure 8:
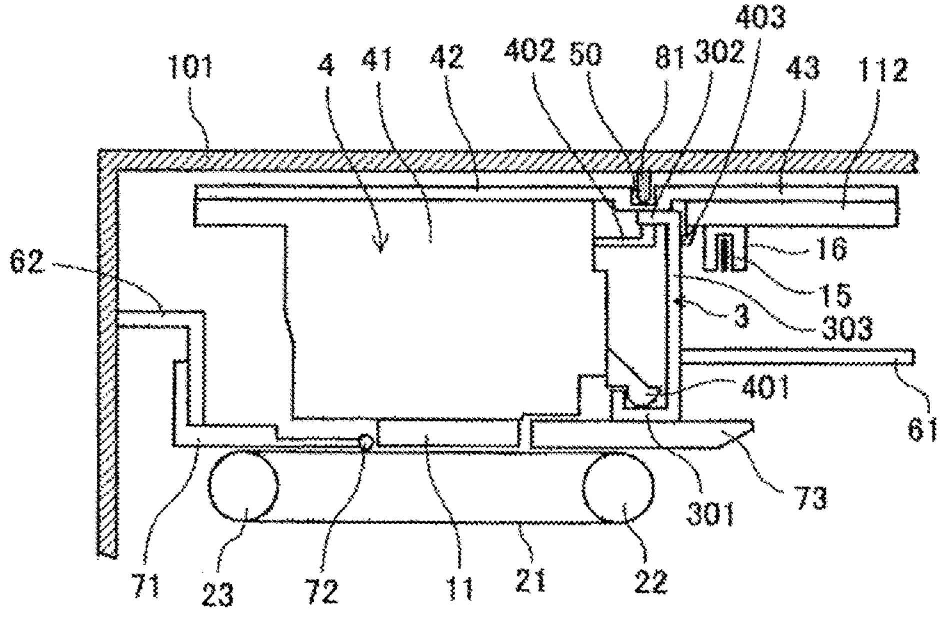
FIG. 8 is a lateral view of the carriage part in a third embodiment.

Next, a third embodiment will be described with reference to FIG. 8. FIG. 8 is a lateral view of the carriage part in the third embodiment. In FIG. 8, parts that are the same as those illustrated in the previously described figures are given by the same reference numbers.

In the third embodiment, instead of the partition member 51 in the first embodiment, a mist collection member 81 is provided as a partition member. The mist collection member 81 may be formed by a brush, a filter, a porous member, a charge member, or the like.

By this configuration in the third embodiment, it is possible to acquire a further mist reduction effect of mist adherence.

Figure 9:
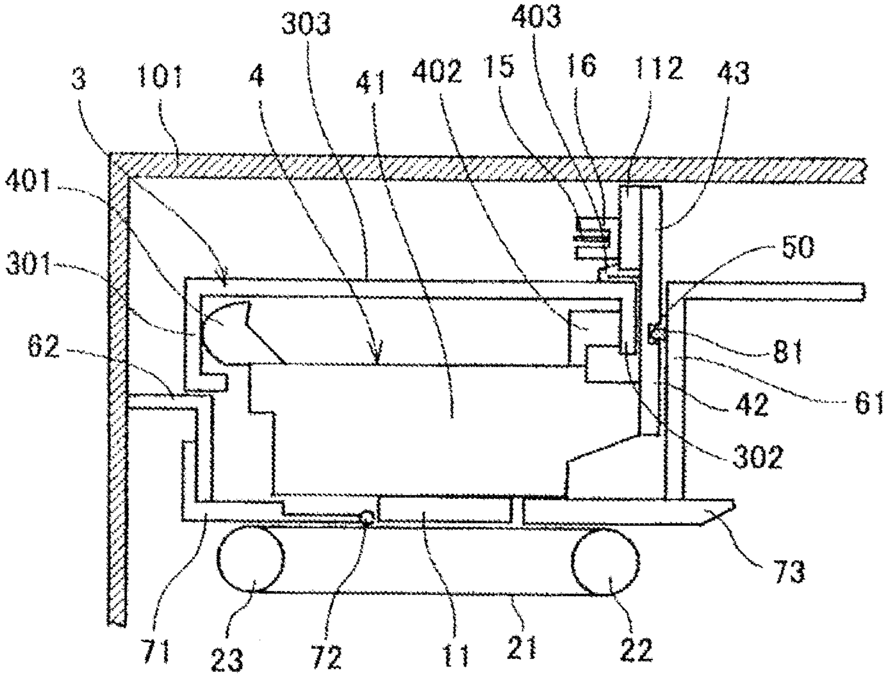
FIG. 9 is a lateral view of the carriage part in a fourth embodiment.

Next, a fourth embodiment will be described with reference to FIG. 9. FIG. 9 is a lateral view of the carriage part in the fourth embodiment. In FIG. 9, parts that are the same as those illustrated in the previously described figures are given by the same reference numbers.

In the fourth embodiment, instead of the partition member 51 in the second embodiment, the mist collection member 81 is provided as the partition member. The mist collection member 81 may be formed by the brush, the filter, the porous member, the charging member, or the like.

By this configuration in the fourth embodiment, it is possible to acquire a further mist reduction effect of mist adherence.

Furthermore, for example, in the first embodiment, the encoder sensor 16 and the encoder scale 15 may be arranged at an upper surface side of the sensor attaching part 43. Similarly, in the second embodiment, the encoder sensor 16 and the encoder scale 15 may be arranged at a side of the sensor attaching part 43 which is opposite to the head mounting part 41.

In the above described embodiments, applications for the image forming apparatus 1000 having a printer configuration are described. However, the first through fourth embodiments are not limited to the printer configuration, and may be applied to another image forming apparatus such as a multifunction apparatus including a printer, a facsimile, a copier, and the like. Also, the first through fourth embodiments may be applied to an image forming apparatus using liquid or fixing process liquid other than the ink in the narrow sense, patterning material, or the like.

The present invention is not limited to the specifically disclosed embodiments, and variations and modifications may be made without departing from the scope of the invention.

The present application is based on Japanese Priority Application No. 2010-277462 filed on Dec. 13, 2010, the entire contents of which are hereby incorporated by reference.

The invention claimed is:

1. An image forming apparatus, comprising:

a carriage that is movable in a main scan direction and includes a head mount and a sensor attachment, a head to discharge droplets being mounted to the head mount, and an encoder sensor that extends downward from a bottom surface of the sensor attachment to read an encoder scale;

a guide that is to slidably guide the carriage and that is disposed along the main scan direction, wherein a portion of the guide is disposed along the main scan direction and parallel to a direction perpendicular to a sub scan direction, wherein the sub scan direction is perpendicular to the main scan direction, and the portion of the guide extends downward from and slidably contacting the carriage, and wherein the sensor attachment includes a sliding structure that abuts the guide, and the sliding structure slidably guides the sensor attachment; and a partition that is fixed and is a distinct structure from the guide and is separated from the guide, wherein the carriage is movable relative to the partition, and there is a gap between the partition and the carriage, the portion of the guide and the partition are disposed between the head mount and the encoder sensor in the sub scan direction and the partition has, between the head mount and the encoder sensor, a first face facing in a direction of an encoder sensor side of the partition and a second face, opposite to the first face, facing in a direction of a side of the partition with the head mount, and the portion of the guide and the encoder sensor overlap in the sub scan direction.

2. The image forming apparatus as claimed in claim 1, wherein the partition is disposed parallel to the main scan direction and parallel to the direction perpendicular to the sub scan direction.

3. The image forming apparatus as claimed in claim 1, wherein the partition is provided across an entirety of the main scan direction in the image forming apparatus.

4. The image forming apparatus of claim 1, wherein the partition is provided in a concave portion of an upper cover of the carriage.

5. The image forming apparatus of claim 1, wherein the partition extends along the main scan direction and has a length in a vertical direction perpendicular to the main and sub scan directions.

6. The image forming apparatus of claim 1, wherein the head mount includes a first sliding part that slidably contacts the guide adjacent to the portion of the guide in the sub scan direction and includes a second sliding part below the first sliding part that slidably contacts the guide.

7. The image forming apparatus of claim 1, wherein the head extends downward from a bottom surface of the head mount.

8. The image forming apparatus of claim 1, wherein the first face and the second face of the partition extend along the main scan direction.

9. The image forming apparatus of claim 1, wherein the partition is separate from any cover of the image forming apparatus and any cover of the carriage, and extends along the main scan direction.

10. The image forming apparatus of claim 1, wherein the head mount includes a first sliding part in contact with the guide in a side-by-side manner with respect to the guide along the sub scan direction, and a second sliding part, below the first sliding part, in contact with the guide.

11. The image forming apparatus of claim 1, wherein the partition is another body with respect to a cover of the image forming apparatus, is located on an underside of the cover, and extends away from the cover and toward a carriage cover of the carriage.

12. The image forming apparatus of claim 1, wherein the partition is above the head mount and the encoder sensor in a vertical direction.

13. The image forming apparatus of claim 1, wherein the partition is disposed in a side-by-side manner with respect to the guide in a vertical direction.

14. The image forming apparatus of claim 1, wherein sensor attachment is between the partition and the encoder scale.

15. The image forming apparatus of claim 1, wherein the encoder sensor does not overlap the partition in the sub scan direction.

16. The image forming apparatus of claim 1, wherein, in the sub scan direction, the head mount, the partition, and the encoder scale are arranged in that order.

17. The image forming apparatus as claimed in claim 1, wherein the portion of the guide is disposed between the head and the encoder sensor in the sub scan direction.

18. The image forming apparatus as claimed in claim 1, further comprising:

a conveyance part configured to convey a recording medium to which an image is formed as a result of the head discharging the droplets to the recording medium, the conveyance part conveying the recording medium in the sub scan direction.

19. The image forming apparatus as claimed in claim 1, wherein the partition does not overlap with the encoder sensor in a vertical direction, wherein the vertical direction is perpendicular to the sub scan direction.

* * * * *